(12) United States Patent
Fairweather

(10) Patent No.: US 8,099,722 B2
(45) Date of Patent: Jan. 17, 2012

(54) METHOD FOR ANALYZING DATA AND PERFORMING LEXICAL ANALYSIS

(76) Inventor: John Fairweather, Santa Monica, CA (US)

(*) Notice: Subject to any disclaimer, the term of this patent is extended or adjusted under 35 U.S.C. 154(b) by 1191 days.

(21) Appl. No.: 11/776,299

(22) Filed: Jul. 11, 2007

(65) Prior Publication Data
US 2008/0016503 A1 Jan. 17, 2008

Related U.S. Application Data

(62) Division of application No. 10/357,326, filed on Feb. 3, 2003, now Pat. No. 7,328,430.

(60) Provisional application No. 60/353,487, filed on Feb. 1, 2002.

(51) Int. Cl.
*G06F 9/45* (2006.01)
*G06F 9/445* (2006.01)

(52) U.S. Cl. .................. 717/143; 717/142; 711/103

(58) Field of Classification Search .......... 717/140–146; 711/103, 114
See application file for complete search history.

(56) References Cited

U.S. PATENT DOCUMENTS

| | | | | |
|---|---|---|---|---|
| 5,410,701 A * | 4/1995 | Gopalraman | ............... | 717/142 |
| 5,826,087 A * | 10/1998 | Lohmann | ............... | 717/146 |
| 6,378,126 B2 * | 4/2002 | Tang | ............... | 717/143 |
| 6,389,379 B1 * | 5/2002 | Lin et al. | ............... | 703/14 |
| 6,654,952 B1 * | 11/2003 | Nair et al. | ............... | 717/157 |
| 6,721,943 B2 * | 4/2004 | Krishnaiyer et al. | ........ | 717/150 |
| 7,093,023 B2 * | 8/2006 | Lockwood et al. | ........... | 709/231 |
| 7,143,345 B2 * | 11/2006 | McKnight et al. | ........... | 715/234 |
| 7,318,144 B2 * | 1/2008 | Najam et al. | .................. | 712/34 |
| 7,328,430 B2 * | 2/2008 | Fairweather | ............... | 717/136 |
| 7,340,724 B2 * | 3/2008 | Wolff et al. | .................. | 717/117 |
| 7,464,254 B2 * | 12/2008 | Sharangpani et al. | ........ | 712/300 |
| 7,512,634 B2 * | 3/2009 | McMillen | ............... | 1/1 |
| 7,624,385 B2 * | 11/2009 | Waddington et al. | ......... | 717/143 |
| 7,899,976 B2 * | 3/2011 | Pandya | ............... | 711/103 |

OTHER PUBLICATIONS

Liu et al, "Testing of uncustomized segmented channel field programmable gate arrays", ACM FPGA, pp. 1-7, 1995.*
Chong et al, "Flexible multi mode embedded floating point unit for field programmable gate arrays", ACM FPGA, pp. 171-180, 2009.*
Chan et al, "Parallel placement for filed programmable gate arrays", ACM FPGA, pp. 43-50, 2003.*
Chau et al, "A compariosn of via programmable gate array logic cell circuits", ACM FPGA, pp. 53-61, 2009.*
Rahman et al, "Evaluation of low leakage design techniques for filed programmable gate arrays", ACM FPGA, pp. 23-30, 2004.*
Fleischmann et al, "A hardware/software prototyping environment for dynamically reconfigurable embedded systems", IEEE, pp. 1-5, 1998.*

* cited by examiner

*Primary Examiner* — Anil Khatri
(74) *Attorney, Agent, or Firm* — Stanley J. Gradisar Attorney at Law, LLC; Stanley J. Gradisar

(57) ABSTRACT

A system and method provide the ability to construct lexical analyzers on the fly in an efficient and pervasive manner. The system and method split the table describing the automata into two distinct tables and splits the lexical analyzer into two phases, one for each table. The two phases consist of a single transition algorithm and a range transition algorithm, both of which are table driven and permit the dynamic modification of those tables during operation. A third 'entry point' table may also be used to speed up the process of finding the first table element from state 0 for any given input character.

9 Claims, 10 Drawing Sheets

FIGURE 2

```
typedef struct ET_OneCat
{
    unsChar      catalyst;    // catalyst character        ] 205
    char         flags;       // flags character           ] 210
    unsInt32     offset;      // offset to next table entry ] 215
} ET_OneCat, *ET_OneCatPtr;
```

```
typedef struct ET_CatRange
{
unsChar        lstat;    // lower bound of starting states          ⎤ 305
unsChar        hstat;   // upper bound of starting states          ⎤ 310
unsChar        lcat;        // lower bound of catalyst character   ⎤ 315
unsChar        hcat;       // upper bound of catalyst character   ⎤ 320
unsChar        estat;   // ending state if transition made         ⎤ 325
} ET_CatRange, *ET_CatRangePtr;
```
300

FIGURE 5

| typedef struct ET_Lex | | // structure of lexical recognizer DB | |
|---|---|---|---|
| { | | | |
| int32 | oneCatMax; | // # of elements in 'oneCat' | 501 |
| int32 | catRangeMax; | // # of elements in 'catRange' | 502 |
| int32 | lexFlags; | // behavior configuration options | 503 |
| int32 | maxToken; | // highest token # in table | 504 |
| int32 | nSymbols; | // number of symbols in table | 505 |
| char | name[32]; | // name of Lex DB | 506 |
| int32 | Dels[256/(8*sizeof(int32))]; | // holds delimiter characters for DB | 507 |
| int32 | maxAccState; | // highest accepting state for CatRange[] | 508 |
| unsChar | whitespace[8]; | // additional white-space chars | 509 |
| int32 | entry[256]; | // entry points for each character | 510 |
| ET_OneCat | oneCat[ oneCatMax ]; | // single transitions | 511 |
| ET_CatRange | catRange[ catRangeMax ]; | // range transitions | 512 |
| } ET_Lex, **ET_LexHdl; | | | |

500

METHOD FOR ANALYZING DATA AND PERFORMING LEXICAL ANALYSIS

CROSS-REFERENCES TO RELATED APPLICATIONS

This application is a divisional application of application Ser. No. 10/357,326 filed on Feb. 3, 2003, titled "SYSTEM AND METHOD FOR ANALYZING DATA," which claims the benefit of U.S. Provisional Application Ser. No. 60/353,487 filed on Feb. 1, 2002, titled "INTEGRATED MULTIMEDIA INTELLIGENCE ARCHITECTURE," both of which are incorporated herein by reference in their entirety for all that is taught and disclosed therein.

BACKGROUND OF THE INVENTION

Lexical analyzers are generally used to scan sequentially through a sequence or "stream" of characters that is received as input and returns a series of language tokens to the parser. A token is simply one of a small number of values that tells the parser what kind of language element was encountered next in the input stream. Some tokens have associated semantic values, such as the name of an identifier or the value of an integer. For example if the input stream was:

```
dst = src + dst->moveFrom
```

After passing through the lexical analyzer, the stream of tokens presented to the parser might be:

```
(tok=1,string="dst") -- i.e., 1 is the token for identifier
(tok=100, string="=")
(tok=1,string="src")
(tok=101, string="+")
(tok=1,string="dst")
(tok=102, string="->")
(tok=1,string="moveFrom")
```

To implement a lexical analyzer, one must first construct a Deterministic Finite Automaton (DFA) from the set of tokens to be recognized in the language. The DFA is a kind of state machine that tells the lexical analyzer given its current state and the current input character in the stream, what new state to move to. A finite state automaton is deterministic if it has no transitions on input C (epsilon) and for each state, S, and symbol, A, there is at most one edge labeled A leaving S. In the present art, a DFA is constructed by first constructing a Non-deterministic Finite Automaton (NFA). Following construction of the NFA, the NFA is converted into a corresponding DFA. This process is covered in more detail in most books on compiler theory.

In FIG. 1, a state machine that has been programmed to scan all incoming text for any occurrence of the keywords "dog", "cat", and "camel" while passing all other words through unchanged is shown. The NFA begins at the initial state (0). If the next character in the stream is 'd', the state moves to 7, which is a non-accepting state. A non-accepting state is one in which only part of the token has been recognized while an accepting state represents the situation in which a complete token has been recognized. In FIG. 1, accepting states are denoted by the double border. From state 7, if the next character is 'o', the state moves to 8. This process will then repeat for the next character in the stream. If the lexical analyzer is in an accepting state when either the next character in the stream does not match or in the event that the input stream terminates, then the token for that accepting state is returned. Note that since "cat" and "camel" both start with "ca", the analyzer state is "shared" for both possible "Lexemes". By sharing the state in this manner, the lexical analyzer does not need to examine each complete string for a match against all possible tokens, thereby reducing the search space by roughly a factor of 26 (the number of letters in the alphabet) as each character of the input is processed. If at any point the next input token does not match any of the possible transitions from a given state, the analyzer should revert to state 10 which will accept any other word (represented by the dotted lines above). For example if the input word were "doctor", the state would get to 8 and then there would be no valid transition for the 'c' character resulting in taking the dotted line path (i.e., any other character) to state 10. As will be noted from the definition above, this state machine is an NFA not a DFA. This is because from state 0, for the characters 'c' and 'd', there are two possible paths, one directly to state 10, and the others to the beginnings of "dog" and "cat", thus we violate the requirement that there be one and only one transition for each state-character pair in a DFA.

Implementation of the state diagram set forth in FIG. 1 in software would be very inefficient. This is in part because, for any non-trivial language, the analyzer table will need to be very large in order to accommodate all the "dotted line transitions". A standard algorithm, often called 'subset construction', is used to convert an NFA to a corresponding DFA. One of the problems with this algorithm is that, in the worst-case scenario, the number of states in the resulting DFA can be exponential to the number of NFA states. For these reasons, the ability to construct languages and parsers for complex languages on the fly is needed. Additionally, because lexical analysis is occurring so pervasively and often on many systems, lexical analyzer generation and operation needs to be more efficient.

SUMMARY OF INVENTION

The following system and method provides the ability to construct lexical analyzers on the fly in an efficient and pervasive manner. Rather than using a single DFA table and a single method for lexical analysis, the present invention splits the table describing the automata into two distinct tables and splits the lexical analyzer into two phases, one for each table. The two phases consist of a single transition algorithm and a range transition algorithm, both of which are table driven and, by eliminating the need for NFA to DFA conversion, permit the dynamic modification of those tables during operation. A third 'entry point' table may also be used to speed up the process of finding the first table element from state 0 for any given input character (i.e., states 1 and 7 in FIG. 1). This third table is merely an optimization and is not essential to the algorithm. The two tables are referred to as the 'onecat' table and the 'catrange' table. The onecat table includes records, of type "ET_onecat", that include a flag field, a catalyst field, and an offset field. The catalyst field of an ET_onecat record specifies the input stream character to which this record relates. The offset field contains the positive (possibly scaled) offset to the next record to be processed as part of recognizing the stream. Thus the 'state' of the lexical analyzer in this implementation is actually represented by the current 'onecat' table index. The 'catrange' table consists of an ordered series of records of type ET_CatRange, with each record having the fields 'lstat' (representing the lower bound of starting states), 'hstat' (representing the upper bound of starting states), 'kat' (representing the lower bound of catalyst character), 'heat' (representing the upper bound of catalyst character) and 'estat' (representing the ending state if the transition is made).

The method of the present invention begins when the analyzer first loops through the 'onecat' table until it reaches a record with a catalyst character of 0, at which time the 'offset' field holds the token number recognized. If this is not the final state after the loop, the lexical analyzer has failed to recognize a token using the 'onecat' table and must now re-process the input stream using the 'catrange' table. The lexical analyzer loops re-scanning the 'catrange' table from the beginning for each input character looking for a transition where the initial analyzer state lies between the 'lstat' and 'hstat' bounds, and the input character lies between the 'lcat' and 'hcat' bounds. If such a state is found, the analyzer moves to the new state specified by 'estat'. If the table runs out (denoted by a record with 'lstat' set to 255) or the input string runs out, the loop exits.

The invention also provides a built-in lexical analyzer generator to create the catrange and onecat tables. By using a two-table approach, the generation phase is extremely fast but more importantly, it can be incremental, meaning that new symbols can be added to the analyzer while it is running. This is a key difference over conventional approaches because it opens up the use of the lexical analyzer for a variety of other purposes that would not normally be possible. The two-phase approach of the present invention also provides significant advantages over standard techniques in terms of performance and flexibility when implemented in software, however, more interesting applications exist when one considers the possibility of a hardware implementation. As further described below, this invention may be implemented in hardware, software, or both.

BRIEF DESCRIPTION OF THE FIGURES

FIG. 2 illustrates a sample ET_onecat record using the C programming language.

FIG. 3 illustrates a sample ET_catrange record using the C programming language.

FIG. 5 illustrates a sample structure for a recognizer DB.

DETAILED DESCRIPTION OF THE PREFERRED EMBODIMENT

The following description of the invention references various C programming code examples that are intended to clarify the operation of the method and system. This is not intended to limit the invention as any number of programming languages or implementations may be used.

Figure 1:
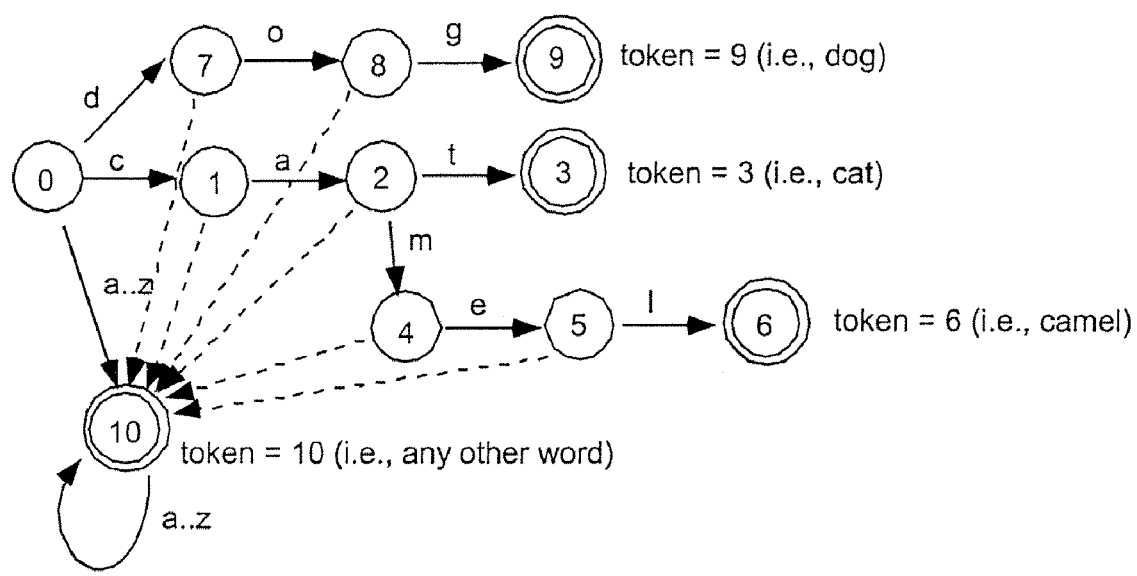
FIG. 1 illustrates a sample non-deterministic finite automaton.

The present invention provides an improved method and system for performing lexical analysis on a given stream of input. The present invention comprises two distinct tables that describe the automata and splits the lexical analyzer into two phases, one for each table. The two phases consist of a single transition algorithm and a range transition algorithm. A third 'entry point' table may also be used to speed up the process of finding the first table element from state 0 for any given input character (i.e., states 1 and 7 in FIG. 1). This third table is merely an optimization and is not essential to the algorithm. The two tables are referred to as the 'onecat' table and the 'catrange' table.

Referring now to FIG. 2, programming code illustrating a sample ET_onecat record 200 is provided. The onecat table includes records, of type "ET_onecat", that include a flag field, a catalyst field, and an offset field. The catalyst field of an ET_onecat record specifies the input stream character to which this record relates. The offset field contains the positive (possibly scaled) offset to the next record to be processed as part of recognizing the stream. Thus the 'state' of the lexical analyzer in this implementation is actually represented by the current 'onecat' table index. The 'onecat' table is a true DFA and describes single character transitions via a series of records of type ET_onecat 200. A variety of specialized flag definitions exist for the flags field 210 but for the purposes of clarity, only 'kLexJump' and 'kNeedDelim' will be considered. The catalyst field 205 of an ET_onecat record 200 specifies the input stream character to which this record relates. The offset field 215 contains the positive (possibly scaled) offset to the next record to be processed as part of recognizing the stream. Thus the 'state' of the lexical analyzer in this implementation is actually represented by the current 'onecat' table index. For efficiency, the various 'onecat' records may be organized so that for any given starting state, all possible transition states are ordered alphabetically by catalyst character.

The basic algorithm for the first phase of the lexical analyzer, also called the onecat algorithm, is provided. The algorithm begins by looping through the 'onecat' table (not shown) until it reaches a record with a catalyst character of 0, at which time the 'offset' field 215 holds the token number recognized. If this is not the final state after the loop, the algorithm has failed to recognize a token using the 'onecat' table and the lexical analyzer must now re-process the input stream from the initial point using the 'catrange' table.

```
ch = *ptr;                                    // 'ptr'
tbl = &onecat[entryPoint[ch]];                // initialize using 3rd table
for ( done = NO ;; )
{
tch = tbl->catalyst;
state = tbl->flags;
    if ( !*ptr ) done = YES;                  // oops! the source string ran out!
if ( tch == ch )                              // if 'ch' matches catalyst char
{                                             //   match found, increment to next
if ( done ) break;                            // exit if past the terminating NULL
tbl++;                                        // increment pointer if char accepted
ptr++;                                        // in the input stream.
ch = *ptr;
}
else if ( tbl->flags & kLexJump )
tbl += tbl->offset;                           // there is a jump alternative available
else break;                                   // no more records, terminate loop
}
match = !tch && (*ptr is a delimiter || !(state &
(kNeedDelim+kLexJump)));
``` if (match) return tbl→offset; // on success, offset field holds token#

Referring now to FIG. 3, sample programming code for creating an ET_Catrange record 300 is shown. The 'catrange' table (not shown) consists of an ordered series of records of type ET_CatRange 300. In this implementation, records of type ET_CatRange 300 include the fields 'lstat' 305 (representing the lower bound of starting states), 'hstat' 310 (representing the upper bound of starting states), 'lcat' 315 (representing the lower bound of catalyst character), 'hcat' 320 (representing the upper bound of catalyst character) and 'estat' 325 (representing the ending state if the transition is made). These are the minimum fields required but, as described above, any number of additional fields or flags may be incorporated.

A sample code implementation of the second phase of the lexical analyzer algorithm, also called the catrange algorithm, is set forth below.

```
tab = tab1 = &catRange[0];
state = 0;
ch = *ptr;
for (;;)
{                                      // LSTAT byte = 255 ends table
if ( tab->lstat == 255 ) break;
else if ( ( tab->lstat <= state && state <= tab->hstat ) &&
( tab->lcat <= ch && ch <= tab->hcat ) )
{                         // state in range & input char a valid catalyst
state = tab->estat; // move to final state specified
ptr++;                                          // accept character
ch = *ptr;
if ( !ch ) break;     // whoops! the input string ran out
tab = tab1;             // start again at beginning of table
}
else tab++;                              // move to next record if not end
}
if ( state > maxAccState || *ptr not a delimiter && *(ptr-1) not a delimiter )
return bad token error
return state
```

As the code above illustrates, the process begins by looping and re-scanning the 'catRange' table from the beginning for each input character looking for a transition where the initial analyzer state lies between the 'lstat' 305 and 'hstat' 310 bounds, and the input character lies between the 'lcat' 315 and 'hcat' 320 bounds. If such a state is found, the analyzer moves to the new state specified by 'estat' 325. If the table runs out (denoted by a record with 'lstat' set to 255) or the input string runs out, the loop exits. In the preferred embodiment, a small number of tokens will be handled by the 'catRange' table (such an numbers, identifiers, strings etc.) since the reserved words of the language to be tokenized will be tokenized by the 'onecat' phase. Thus, the lower state values (i.e. <64) could be reserved as accepting while states above that would be considered non-accepting. This boundary line is specified for a given analyzer by the value of 'maxAccState' (not shown).

To illustrate the approach, the table specification below is sufficient to recognize all required 'catRange' symbols for the C programming language:

```
0 1 1 a z           <eol> 1 = Identifier
0 1 1 _ _           <eol> more identifier
1 1 1 0 9           <eol> more identifier
0 0 100 ' '         <eol> ' begins character constant
100 100 101 \ \     <eol> a \ begins character escape sequence
101 102 102 0 7     <eol> numeric character escape sequence
101 101 103 x x     <eol> hexadecimal numeric character escape sequence
103 103 103 a f     <eol> more hexadecimal escape sequence
103 103 103 0 9     <eol> more hexadecimal escape sequence
100 100 2 ' '       <eol> ' terminates the character sequence
102 103 2 ' '       <eol> you can have multiple char constants
100 103 100         <eol> 2 = character constant
0 0 10 0 0          <eol> 10 = octal constant
10 10 10 0 7        <eol> more octal constant
0 0 3 1 9           <eol> 3 = decimal number
3 3 3 0 9           <eol> more decimal number
0 0 110 . .         <eol> start of fp number
3 3 4 . .           <eol> 4 = floating point number
10 10 4 . .         <eol> change octal constant to fp #
4 4 4 0 9           <eol> more fp number
110 110 4 . .       <eol> more fp number
3 4 111 e e         <eol> 5 = fp number with exponent
10 10 111 e e       <eol> change octal constant to fp #
111 111 5 0 9       <eol> more exponent
111 111 112 + +     <eol> more exponent
0 0 0 \ \           <eol> continuation that does not belong to anything
111 111 112 - -     <eol> more exponent
112 112 5 0 9       <eol> more exponent
5 5 5 0 9           <eol> more exponent
4 5 6 f f           <eol> 6 = fp number with optional float marker
4 5 6 1 1           <eol> more float marker
10 10 120 x x       <eol> beginning hex number
120 120 7 0 9       <eol> 7 = hexadecimal number
120 120 7 a f       <eol> more hexadecimal
7 7 7 0 9           <eol> more hexadecimal
7 7 7 a f           <eol> more hexadecimal
7 7 8 l l           <eol> 8 = hex number with L or U specifier
7 7 8 u u           <eol>
3 3 9 l l           <eol> 9 = decimal number with L or U specifier
3 3 9 u u           <eol>
10 10 11 l l        <eol> 11 = octal constant with L or U specifier
10 10 11 u u        <eol>
0 0 130 " "         <eol> begin string constant...
130 130 12 " "      <eol> 12 = string constant
130 130 13 \ \      <eol> 13 = string const with line continuation '\'
13 13 131 0 7       <eol> numeric character escape sequence
131 131 131 0 7     <eol> numeric character escape sequence
13 13 132 x x       <eol> hexadecimal numeric character escape sequence
131 132 12 " "      <eol> end of string
13 13 130           <eol> anything else must be char or escape char
132 132 132 a f     <eol> more hexadecimal escape sequence
132 132 132 0 9     <eol> more hexadecimal escape sequence
130 132 130         <eol> anything else is part of the string
```

In this example, the 'catRange' algorithm would return token numbers 1 through 13 to signify recognition of various C language tokens. In the listing above (which is actually valid input to the associated lexical analyzer generator), the 3 fields correspond to the 'lstat' 305, 'hstat' 310, 'estat' 325, 'lcat' 315 and 'hcat' 320 fields of the ET_CatRange record 300. This is a very compact and efficient representation of what would otherwise be a huge number of transitions in a conventional DFA table. The use of ranges in both state and input character allow us to represent large numbers of transitions by a single table entry. The fact that the table is re-scanned from the beginning each time is important for ensuring that correct recognition occurs by arranging the table elements appropriately. By using this two pass approach, we have trivially implemented all the dotted-line transitions shown in the initial state machine diagram as well as eliminating the need to perform the NFA to DFA transformation. Additionally since the 'oneCat' table can ignore the possibility of multiple transitions, it can be optimized for speed to a level not attainable with the conventional NFA→DFA approach.

The present invention also provides a built-in lexical analyzer generator to create the tables described. 'CatRange' tables are specified in the format provided in FIG. 3, while 'oneCat' tables may be specified via application programming interface or "API" calls or simply by specifying a series of lines of the form provided below.

---
[ token# ] tokenString [ . ]
---

As shown above, in the preferred embodiment, a first field is used to specify the token number to be returned if the symbol is recognized. This field is optional, however, and other default rules may be used. For example, if this field is omitted, the last token number+1 may be used instead. The next field is the token string itself, which may be any sequence of characters including whitespace. Finally, if the trailing period is present, this indicates that the 'kNeedDelim' flag (the flags word bit for needs delimiter, as illustrated in FIG. 2) is false, otherwise it is true.

Because of the two-table approach, this generation phase is extremely fast. More importantly, however, the two table approach can be incremental. That is, new symbols can be added to the analyzer while it is running. This is a key difference over conventional approaches because it opens up the use of the lexical analyzer for a variety of other purposes that would not normally be possible. For example, in many situations there is a need for a symbolic registration database wherein other programming code can register items identified by a unique 'name'. In the preferred embodiment, such registries are implemented by dynamically adding the symbol to a 'oneCat' table, and then using the token number to refer back to whatever was registered along with the symbol, normally via a pointer. The advantage of this approach is the speed with which both the insertion and the lookup can occur. Search time in the registry is also dramatically improved over standard searching techniques (e.g., binary search). Specifically, search time efficiency (the "Big O" efficiency) to lookup a given word is proportional to the log (base N) of the number of characters in the token, where 'N' is the number of different ASCII codes that exist in significant proportions in the input stream. This is considerably better than standard search techniques. Additionally, the trivial nature of the code needed to implement a lookup registry and the fact that no structure or code needs to be designed for insertion, removal and lookup, make this approach very convenient.

In addition to its use in connection with flat registries, this invention may also be used to represent, lookup, and navigate through hierarchical data. For example, it may be desirable to 'flatten' a complete directory tree listing with all files within it for transmission to another machine. This could be easily accomplished by iterating through all files and directories in the tree and adding the full file path to the lexical analyzer database of the present invention. The output of such a process would be a table in which all entries in the table were unique and all entries would be automatically ordered and accessible as a hierarchy.

Figure 4:
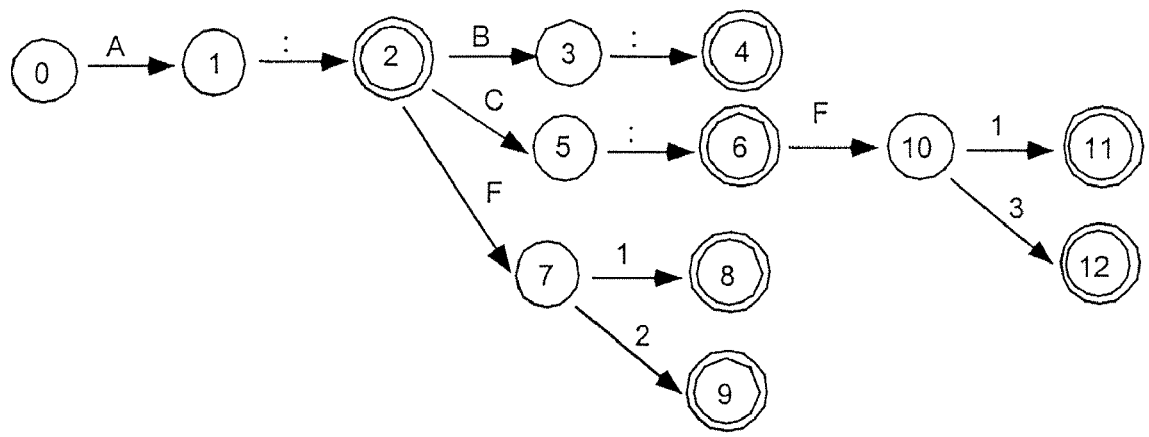
FIG. 4 illustrates a state diagram representing a directory tree.

Referring now to FIG. 4, a state diagram representing a directory tree is shown. The directory tree consists of a directory A containing sub-directories B and C and files F1 and F2 and sub-directory C contains F1 and F3. A function, LX_List( ), is provided to allow alphabetized listing of all entries in the recognizer database. When called successively for the state diagram provided in FIG. 6, it will produce the sequence:

"A:", "A:B:", "A:C:", "A:C:F1", "A:C:F3", "A:F1", "A:F2"

Furthermore, additional routines may be used to support arbitrary navigation of the tree. For example, routines could be provided that will prune the list (LX_PruneList( ), to save the list (LX_SaveListContext( )) and restore the list (LX_RestoreListContext( )). The routine LX_PruneList( ) is used to "prune" the list when a recognizer database is being navigated or treated as a hierarchical data structure. In one embodiment, the routine LX_PruneList( ) consists of nothing more than decrementing the internal token size used during successive calls to LX_List( ). The effect of a call to LX_PruneList( ) is to remove all descendant tokens of the currently listed token from the list sequence. To illustrate the point, assume that the contents of the recognizer DB represent the file/folder tree on a disk and that any token ending in ':' is a folder while those ending otherwise are files. A program could easily be developed to enumerate all files within the folder "Disk:MyFiles:" but not any files contained within lower level folders. For example, the following code demonstrates how the LX_PruneList( ) routine is used to "prune" any lower level folders as desired:

```
tokSize = 256;                                          // set max file path length
prefix = "Disk:MyFiles:";
toknum = LX_List(theDB,0,&tokSize,0,prefix);            // initialize to start folder path
while ( toknum != -1 )                                  // repeat for all files
{
   toknum = LX_List(theDB,fName,&tokSize,0,prefix);     // list next file name
   if (toknum != -1 )                                   // is it a file or a folder ?
      if ( fName[tokSize-1] == ':' )                    // it is a folder
         LX_PruneList(theDB)                            // prune it and all it's children
      else                                              // it is a file...
         -- process the file somehow
}
```

In a similar manner, the routines LX_SaveListContext( ) and LX_RestoreListContext( ) may be used to save and restore the internal state of the listing process as manipulated by successive calls to LX_List( ) in order to permit nested/recursive calls to LX_List( ) as part of processing a hierarchy. These functions are also applicable to other non-recursive situations where a return to a previous position in the listing/navigation process is desired. Taking the recognizer DB of the prior example (which represents the file/folder tree on a disk), the folder tree processing files within each folder at every level could be recursively walked non-recursively by simply handling tokens containing partial folder paths. If a more direct approach is desired, the recursiveness could be simplified. The following code illustrates one direct and simple process for recursing a tree:

```
void myFunc ( charPtr folderPath )
{
    tokSize = 256;                                              // set max file path length
    toknum = LX_List(theDB,0,&tokSize,0,folderPath);            // initialize to start folder
    while ( toknum != -1 )                                      // repeat for all files
    {
        toknum = LX_List(theDB,fName,&tokSize,0,prefix);        // list next file name
        if (toknum != -1 )                                      // is it a file or a folder ?
            if ( fName[tokSize-1] == ':' )                      // it is a folder
                sprintf(nuPath,"%s%s",folderPath,fName);        // create new folder path
                tmp = LX_SaveListContext(theDB);                // prepare for recursive listing
                myFunc(nuPath);                                 // recurse!
                LX_RestoreListContext(theDB,tmp);               // restore listing context
            else                                                // it is a file...
                -- process the file somehow
    }
}
```

These routines are only a few of the routines that could be used in conjunction with the present invention. Those in the prior art will appreciate that any number of additional routines could be provided to permit manipulation of the DB and lexical analyzer. For example, the following non-exclusive list of additional routines are basic to lexical analyzer use but will not be described in detail since their implementation may be easily deduced from the basic data structures described above:

LX_Add( )—Adds a new symbol to a recognizer table. The implementation of this routine is similar to LX_Lex( ) except when the algorithm reaches a point where the input token does not match, it then enters a second loop to append additional blocks to the recognizer table that will cause recognition of the new token.

LX_Sub( )—Subtracts a symbol from a recognizer table. This consists of removing or altering table elements in order to prevent recognition of a previously entered symbol.

LX_Set( )—Alters the token value for a given symbol. Basically equivalent to a call to LX_Lex( ) followed by assignment to the table token value at the point where the symbol was recognized.

LX_Init( )—Creates a new empty recognizer DB.

LX_KillDB( )—Disposes of a recognizer DB.

LX_FindToken( )—Converts a token number to the corresponding token string using LX_List( ).

In addition to the above routines, additional routines and structures within a recognizer DB may be used to handle certain aspects of punctuation and white space that may vary between languages to be recognized. This is particularly true if a non-Roman script system is involved, such as is the case for many non-European languages. In order to distinguish between delimiter characters (i.e., punctuation etc.) and non-delimiters (i.e., alphanumeric characters), the invention may also include the routines LX_AddDelimiter( ) and LX_SubDelimiter( ). When a recognizer DB is first created by LX_Init( ), the default delimiters are set to match those used by the English language. This set can then be selectively modified by adding or subtracting the ASCII codes of interest. Whether an ASCII character is a delimiter or not is determined by whether the corresponding bit is set in a bit-array 'Dels' associated with the recognizer DB and it is this array that is altered by calls to add or subtract an ASCII code. In a similar manner, determining whether a character is whitespace is crucial to determining if a given token should be recognized, particularly where a longer token with the same prefix exists (e.g., Smith and Smithsonian). For this reason, a second array 'whitespace' is associated with the recognizer DB and is used to add new whitespace characters. For example an Arabic space character has the ASCII value of the English space plus 128. This array is accessed via LX_AddDelimiter( ) and LX_SubDelimiter( ) functions.

A sample structure for a recognizer DB 500 is set forth in FIG. 5. The elements of the structure 500 are as follows: onecatmax 501 (storing the number of elements in 'onecat'), catrangemax 502 (storing number of elements in 'catrange'), lexFlags 503 (storing behavior configuration options), maxToken 504 (representing the highest token number in table), nSymbols 505 (storing number of symbols in table), name 506 (name of lexical recognizer DB 500), Dels 507 (holds delimiter characters for DB), MaxAccState 508 (highest accepting state for catrange), whitespace 509 (for storing additional whitespace characters), entry 510 (storing entry points for each character), onecat 511 (a table for storing single state transitions using record type ET_onecat 200) and catrange 512 (a table storing range transitions and is record type ET_CatRange 400).

As the above description makes clear, the two-phase approach to lexical analysis provides significant advantages over standard techniques in terms of performance and flexibility when implemented in software. Additional applications are enhanced when the invention is implemented in hardware.

Figure 6:
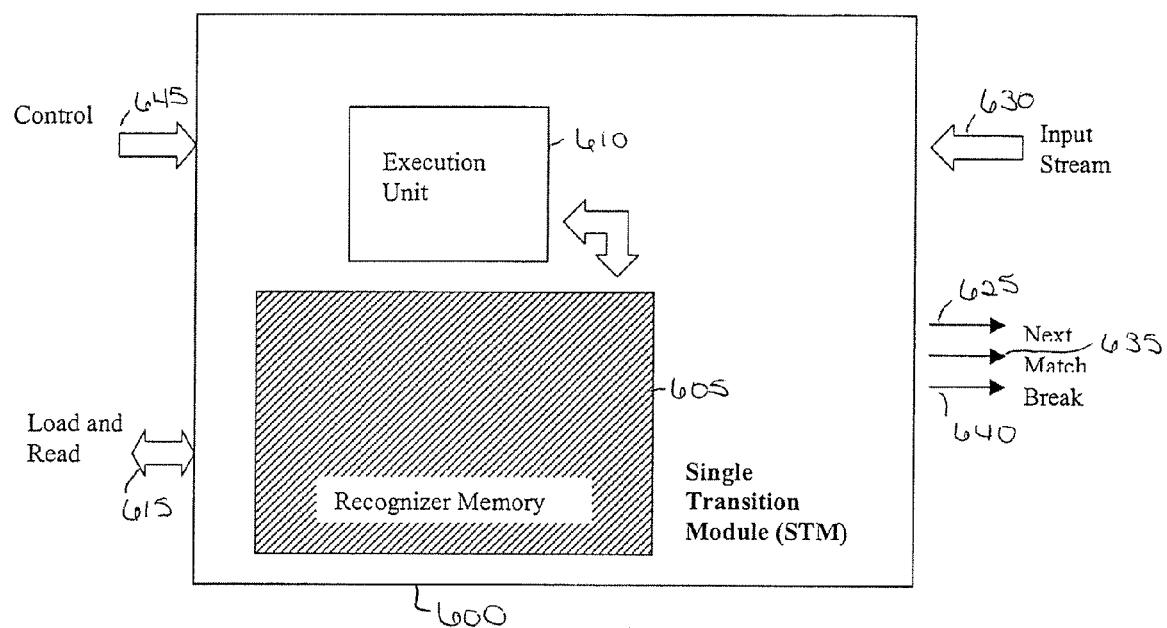
FIG. 6 illustrates a sample implementation of the Single Transition Module.

Referring now to FIG. 6, a sample implementation of a hardware device based on the 'OneCat' algorithm (henceforth referred to as a Single Transition Module 600 or STM 600) is shown. The STM module 600 is preferably implemented as a single chip containing a large amount of recognizer memory 605 combined with a simple bit-slice execution unit 610, such as a 2610 sequencer standard module and a control input 645. In operation the STM 600 would behave as follows:
1) The system processor on which the user program resides (not shown) would load up a recognizer DB 800 into the recognizer memory 605 using the port 615 formatted as a record of type ET_onecat 200.
2) The system processor would initialize the source of the text input stream to be scanned. The simplest external interface for text stream processing might be to tie the 'Next' signal 625 to an incrementing address generator (not shown) such that each pulse on the 'Next' line 625 is output by the STM 600 and requests the system processor to send the next byte of text to the port 630. The contents of the next external memory location (previously loaded with the text to be scanned) would then be presented to the text port 630. The incrementing address generator would be reset to address zero at the same time the STM 600 is reset by the system processor.

Figure 7:
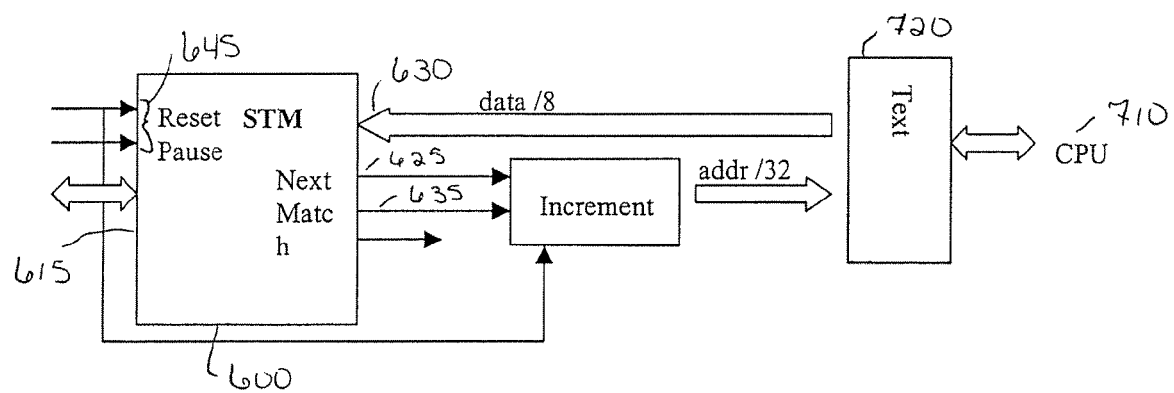
FIG. 7 illustrates the operation of the Single Transition Module.

Referring now to FIG. 7, another illustration of the operation of the STM 600 is shown. As the figure illustrates, once the 'Reset' line 645 is released, the STM 600 fetches successive input bytes by clocking based on the 'Next' line 625, which causes external circuitry to present the new byte to input port 630. The execution unit 610 (as shown in FIG. 6) then performs the 'OneCat' lexical analyzer algorithm described above. Other hardware implementations, via a sequencer or otherwise, are possible and would be obvious to those skilled in the art. In the simple case, where a single word is to be recognized, the algorithm drives the 'Break' line 640 high at which time the state of the 'Match' line 635 determines how the external processor/circuitry 710 should interpret the contents of the table address presented by the port 615. The 'Break' signal 640 going high signifies that the recognizer (not shown) has completed an attempt to recognize a token within the text 720. In the case of a match, the contents presented by the port 615 may be used to determine the token number. The 'Break' line 640 is fed back internally within the Lexical Analyzer Module or 'LAM' (see FIG. 10) to cause the recognition algorithm to re-start at state zero when the next character after the one that completed the cycle is presented.

Figure 8:
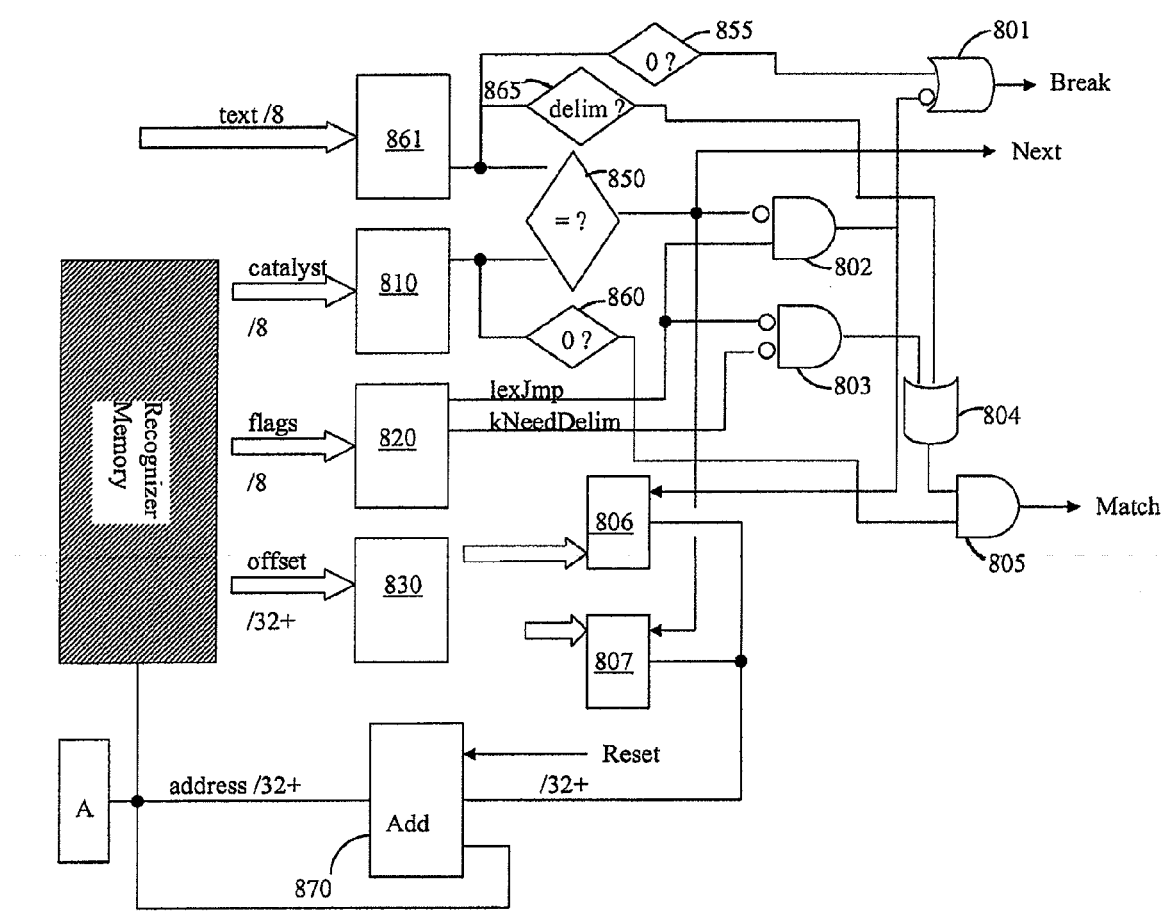
FIG. 8 illustrates a logical representation of a Single Transition Module implementation.

Referring now to FIG. 8, a logical representation of an internal STM implementation is shown. The fields/memory described by the ET_onecat 200 structure is now represented by three registers 810, 820, 830, two of 8 bits 810, 820 and one of at least 32 bits 830 which are connected logically as shown. The 'Break' signal 640 going high signifies that the STM 600 has completed an attempt to recognize a token within the text stream. At this point external circuitry or software can examine the state of the 'Match' line 635 in order to decide between the following actions:

1) If the 'Match' line 635 is high, the external system can determine the token number recognized simply by examining recognizer memory 605 at the address presented via the register labeled A.
2) If the 'Match' line 635 is low, then the STM 600 failed to recognize a legal token and the external system may either ignore the result, reset the STM 600 to try for a new match, or alternatively execute the range transition algorithm starting from the original text point in order to determine if a token represented by a range transition exists. The choice of which option makes sense at this point is a function of the application to which the STM 600 is being applied.

The "=?" block 850, "0?" blocks 855, 860, and "Add" block 870 in FIG. 8 could be implemented using standard hardware gates and circuits. Implementation of the "delim?" block 865 would require the external CPU to load up a 256*1 memory block with 1 bits for all delimiter characters and 0 bits for all others. Once loaded, the "delim?" block 865 would simply address this memory with the 8-bit text character 861 and the memory output (0 or 1) would indicate whether the corresponding character was or was not a delimiter. The same approach can be used to identify white-space characters and in practice a 256*8 memory would be used thus allowing up to 8 such determinations to be made simultaneously for any given character. Handling case insensitive operation is possible via lookup in a separate 256*8 memory block.

In the preferred implementation, the circuitry associated with the 'OneCat' recognition algorithm is segregated from the circuitry/software associated with the 'CatRange' recognition algorithm. The reason for this segregation is to preserve the full power and flexibility of the distinct software algorithms while allowing the 'OneCat' algorithm to be executed in hardware at far greater speeds and with no load on the main system processor. This is exactly the balance needed to speed up the kind of CAM and text processing applications that are described in further detail below. This separation and implementation in hardware has the added advantage of permitting arrangements whereby a large number of STM modules (FIGS. 6 and 7) can be operated in parallel permitting the scanning of huge volumes of text while allowing the system processor to simply coordinate the results of each STM module 600. This supports the development of a massive and scaleable scanning bandwidth.

Figure 9:
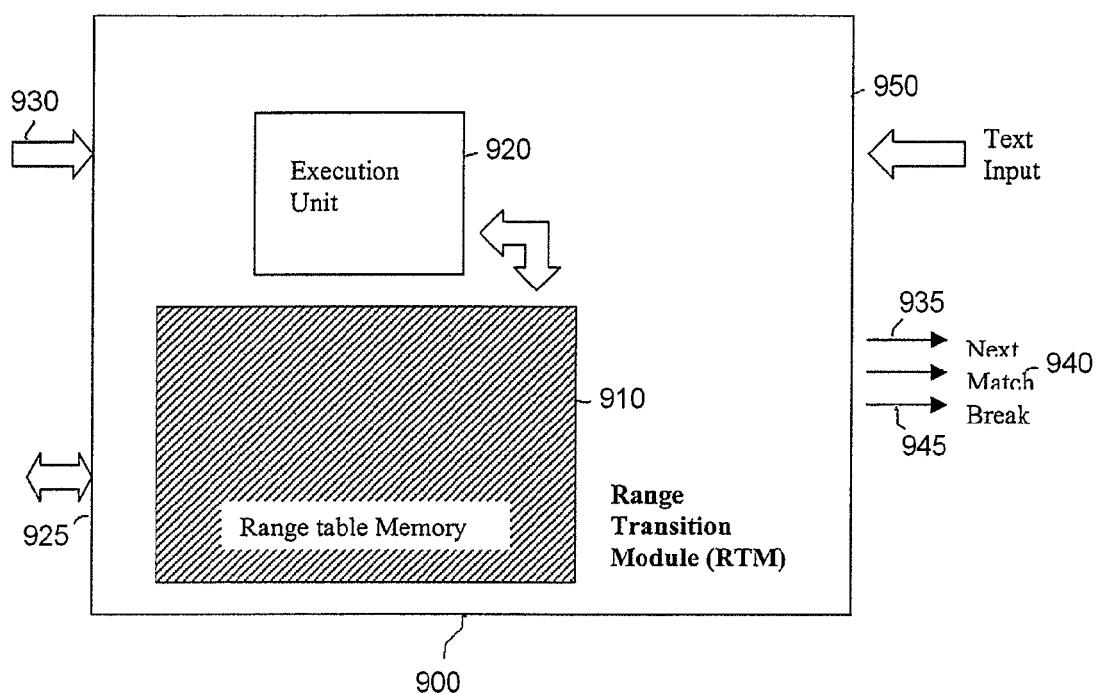
FIG. 9 illustrates a sample implementation of the Range Transition Module.

Referring now to FIG. 9, a sample hardware implementation for the range transition algorithm is shown. The preferred embodiment is a second analyzer module similar to the STM 600, which shall be referred to as the Range Transition Module or RTM 900. The RTM module 900 is preferably implemented as a single chip containing a small amount of range table memory 910 combined with a simple bit-slice execution unit 920, such as a 2910 sequencer standard module. In operation the RTM would behave as follows:

1) The system processor (on which the user program resides) would load up a range table into the range table memory 910 via the port 925, wherein the range table is formatted as described above with reference to ET_CatRange 300.
2) Initialization and external connections, such as the control/reset line 930, next line 935, match line 940 and break line 945, are similar to those for the STM 600.
3) Once the 'Reset' line 930 is released, the RTM 900 fetches successive input bytes by clocking based on the 'Next' line 935 which causes external circuitry to present the new byte to port 950. The execution unit 920 then performs the range transition algorithm. Other implementations, via a sequencer or otherwise are obviously possible.

Figure 10:
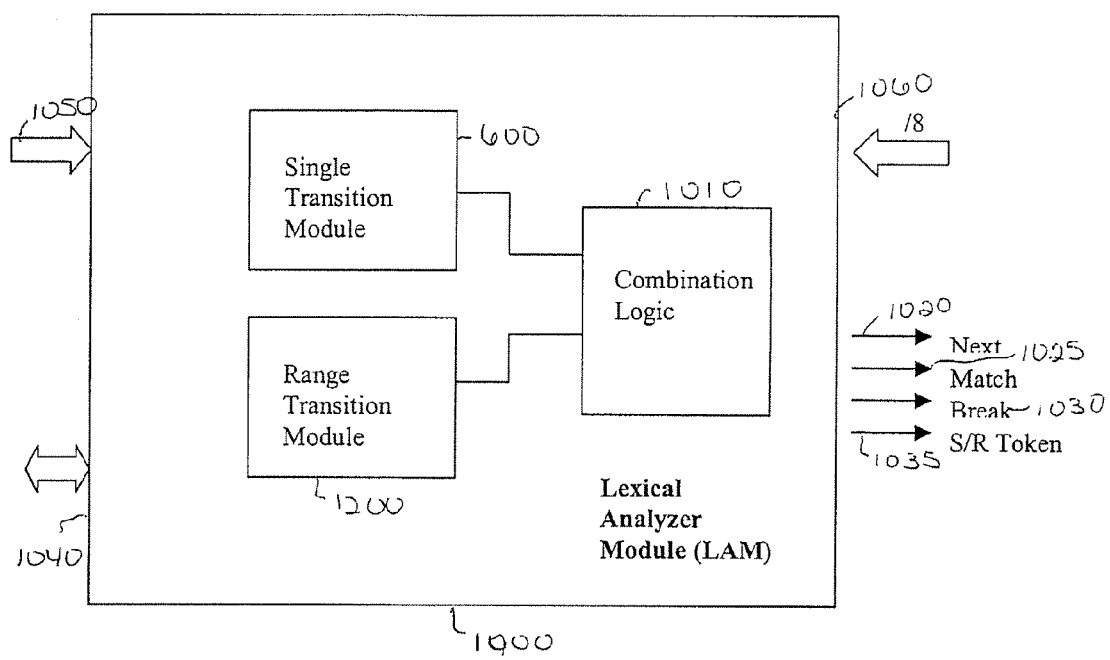
FIG. 10 illustrates a complete hardware implementation of the Single Transition Module and the Range Transition Module.

In a complete hardware implementation of the two-phase lexical analyzer algorithm, the STM and RTM are combined into a single circuit component known as the Lexical Analyzer Module or LAM 1000. Referring now to FIG. 10, a sample LAM 1000 is shown. The LAM 1000 presents a similar external interface to either the STM 600 or RTM 900 but contains both modules internally together with additional circuitry and logic 1010 to allow both modules 600, 900 to be run in parallel on the incoming text stream and their results to be combined. The combination logic 1010 provides the following basic functions in cases where both modules are involved in a particular application (either may be inhibited):

1) The clocking of successive characters from the text stream 1060 via the sub-module 'Next' signals 1025, 1035 must be synchronized so that either module waits for the other before proceeding to process the next text character.
2) The external LAM 'Match' signals 1025 and 'Break' signals 1030 are coordinated so that if the STM module 600 fails to recognize a token but the RTM module 900 is still processing characters, the RTM 900 is allowed to continue until it completes. Conversely, if the RTM 900 completes but the STM 600 is still in progress, it is allowed to continue until it completes. If the STM 600 completes and recognizes a token, further RTM 900 processing is inhibited.
3) An additional output signal "S/R token" 1035 allows external circuitry/software to determine which of the two sub-modules 600, 900 recognized the token and if appropriate allows the retrieval of the token value for the RTM 900 via a dedicated location on port 1040. Alternately, this function may be achieved by driving the address latch to a dedicated value used to pass RTM 900 results. A control line 1050 is also provided.

The final stage in implementing very high performance hardware systems based on this technology is to implement the LAM as a standard module within a large programmable gate array which can thus contain a number of LAM modules all of which can operate on the incoming text stream in parallel. On a large circuit card, multiple gate arrays of this type can be combined. In this configuration, the table memory for all LAMs can be loaded by external software and then each individual LAM is dynamically 'tied' to a particular block of this memory, much in the same manner that the ET_LexHdl structure (described above) achieves in software. Once again, combination logic similar to the combination logic 1010 utilized between STM 600 and RTM 900 within a given LAM 1000 can be configured to allow a set of LAM modules 1000 to operate on a single text stream in parallel. This allows external software to configure the circuitry so that multiple different recognizers, each of which may relate to a particular recognition domain, can be run in parallel. This implementation permits the development and execution of applications that require separate but simultaneous scanning of text streams for a number of distinct purposes. The external software architecture necessary to support this is not difficult to imagine, as are the kinds of sophisticated applications, especially for intelligence purposes, for which this capability might find application.

Once implemented in hardware and preferably as a LAM module 1000, loaded and configured from software, the following applications (not exhaustive) can be created:

1) Content-addressable memory (CAM). In a CAM system, storage is addressed by name, not by a physical storage address derived by some other means. In other words, in a CAM one would reference and obtain the information on "John Smith" simply using the name, rather than by somehow looking up the name in order to obtain a physical memory reference to the corresponding data record. This significantly speeds and simplifies the software involved in the process. One application area for such a system is in ultra-high performance database search systems, such as network routing (i.e., the rapid translation of domains and IP addresses that occurs during all internet protocol routing) advanced computing architectures (i.e., non-Von Neumann systems), object oriented database systems, and similar high performance database search systems.

2) Fast Text Search Engine. In extremely high performance text search applications such as intelligence applications, there is a need for a massively parallel, fast search text engine that can be configured and controlled from software. The present invention is ideally suited to this problem domain, especially those applications where a text stream is being searched for key words in order to route interesting portions of the text to other software for in-depth analysis. High performance text search applications can also be used on foreign scripts by using one or more character encoding systems, such as those developed by Unicode and specifically UTF-8, which allow multi-byte Unicode characters to be treated as one or more single byte encodings.

3) Language Translation. To rapidly translate one language to another, the first stage is a fast and flexible dictionary lookup process. In addition to simple one-to-one mappings, it is important that such a system flexibly and transparently handle the translation of phrases and key word sequences to the corresponding phrases. The present invention is ideally suited to this task.

Other applications. A variety of other applications based on a hardware implementation of the lexical analysis algorithm described are possible including (but not limited to); routing hierarchical text based address strings, sorting applications, searching for repetitive patterns, and similar applications.

The foregoing description of the preferred embodiment of the invention has been represented for the purposes of illustration and description. Any number of other basic features, functions, or extensions of the foregoing method and systems would be obvious to those skilled in the art in light of the above teaching. For example, other basic features that would be provided by the lexical analyzer, but that are not described in detail herein, include case insensitivity, delimiter customization, white space customization, line-end and line-start sensitive tokens, symbol flags and tagging, analyzer backup, and other features of lexical analyzers that are well-known in the prior art. For these reasons, this description is not intended to be exhaustive or to limit the invention to the precise forms disclosed. It is intended that the scope of the invention be limited not by this detailed description but rather by the claims appended hereto.

What is claimed is:

1. A programmable gate array comprising:
   a hardware implementation in the programmable gate array of a two-phase lexical analyzer module "LAM", the two-phase LAM comprising:
   a single transition module having a first table, wherein the first table describes one or more single character transitions using records of type ET_onecat;
   a range transition module having a second table, wherein the second table is an ordered series of records of type ET_catrange; and
   a combination logic for combining the output of the single transition module and the range transition module, wherein when either the range transition module or the single transition module completes its processing and the other module is still processing characters from the incoming text stream, the combination logic allows the other module to complete its processing;
   wherein one or more LAMs implemented into the programmable gate array operate on an incoming text stream in parallel to output a series of language tokens for use by external hardware or external software applications.

2. The programmable gate array according to claim 1 wherein each LAM further comprises:
   a recognizer memory for the single transition module; and
   a range table memory for the range transition module.

3. The programmable gate array according to claim 1 further comprising:
   a table memory for the one or more LAMs.

4. The programmable gate array according to claim 1 further comprising:
   a software function logically connected to the programmable gate array, wherein the software function loads the table memory for the one or more LAMs and dynamically ties each of the one or more LAMs to a particular block of the table memory.

5. The programmable gate array according to claim 1 wherein the combination logic synchronizes the clocking of successive characters from the incoming text stream so that either the single transition module or the range transition module wait for the other before proceeding to process a next text character of the incoming text stream.

6. The programmable gate array according to claim 1 wherein when the single transition module fails to recognize a language token and the range transition module is still processing characters from the incoming text stream, the combination logic allows the range transition module to complete its processing.

7. The programmable gate array according to claim 1 wherein the combination logic allows the software function to determine which of the single transition module or the range transition module recognized the outputted language token.

8. The programmable gate array according to claim 1 wherein the external hardware or software applications further comprise at least a one of text searching, pattern matching, language translation, sorting, content addressable memory and lookup, and software parser.

9. The programmable gate array according to claim 1 wherein an additional memory block associated with the one or more LAMs, and addressed using the current character value, can be loaded by the external software applications in order to implement and support additional features such as configurable delimiter characters, whitespace determination, and case insensitivity.

* * * * *